July 19, 1949.     C. A. CLELAND     2,476,836
ROTARY PLOW
Filed Dec. 17, 1945
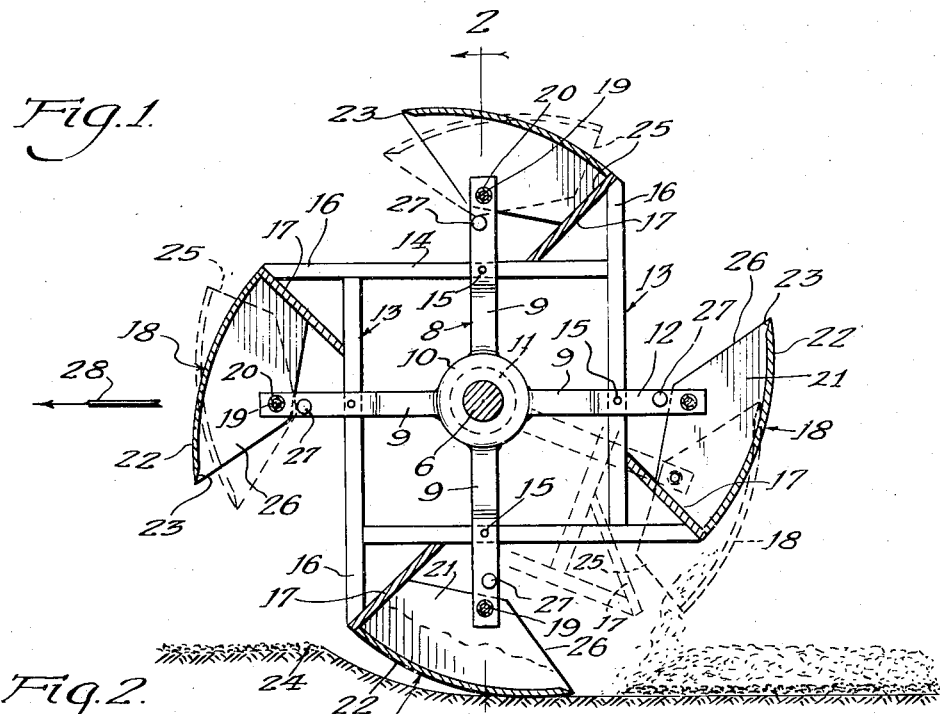
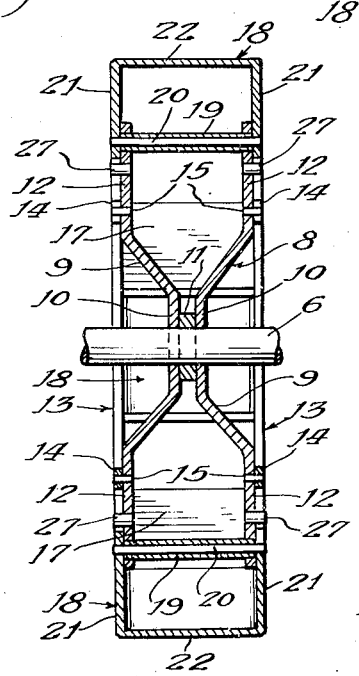
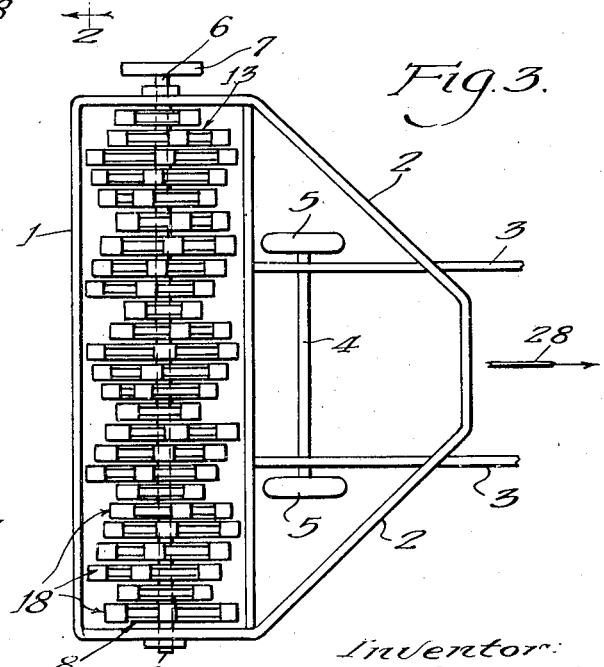
Inventor:
Charles A. Cleland
By Louis A. Bisson,
Attorney Patented July 19, 1949

2,476,836

UNITED STATES PATENT OFFICE 2,476,836

ROTARY PLOW

Charles A. Cleland, Batavia, Ill.

Application December 17, 1945, Serial No. 635,470

3 Claims. (Cl. 97—216)

1

The present invention relates to a rotary-type of plow device or machine having a plurality of plow assemblies arranged in rank and each assembly having a plurality of plow units so arranged that a unit of an assembly will operate or be actuated in succession to a corresponding unit of an adjacent assembly, or, in other words, in staggered time relation.

Among the objects of the invention is to provide a novel device of the character mentioned whereby a plurality of plow assemblies are operated or actuated, as rotated, about a shaft suitably driven from a tractor or like means, or from power means on a tractor or the like, while causing the plow device or machine, as a whole, to travel over the ground to be plowed or tilled, there being suitable means for supporting the shaft and assemblies associated therewith, for such travel, each assembly having supporting means connected to the shaft and to the plow units to operate or actuate them, and each unit having a plow share or scoop-like member so connected or mounted as to be automatically operated or actuated, as by centrifugal force or otherwise, by power operated means, together with means for limiting the extent or range of actuation of the share when dumping or kicking the plowed material, such as humus or the like, and soil, and means also for closing the dumping or kicking part of the plow share during the plowing action and until the plow share reaches the position for the dumping or kicking effect.

Another object of the invention is to provide a novel plow share, a novel means for supporting the plow share, a novel means for limiting the actuation of the plow share, and a novel means for closing the rear or trailing end of the plow share during the plowing operation and for opening after the plowing action for dumping or kicking the plowed material.

Other objects, advantages, capabilities, features, and the like are comprehended by the invention as will later appear, and as are inherently possessed by the invention.

Referring briefly to the drawings:

Fig. 1 is a part sectional and part side view in elevation of an assembly constructed in accordance with the invention;

Fig. 2 is a vertical sectional view taken in a plane represented by line 2—2 in Fig. 1 of the drawings; and, Fig. 3 is a somewhat general and part top plan view of the device.

Referring more in detail to the drawings, the embodiment selected to illustrate the invention is

2 shown as having a frame or chassis or the like 1, having suitable frame parts or brace members 2, a hitch part 3, suitably carried on a wheeled support 4, and wheels 5 adapted to ride on the ground, the parts 3 being suitably hitched to a drafting means such as a tractor or the like (not shown).

In the frame part 1 is suitably rotatably mounted a shaft 6 to any point of which, as at an end thereof, may be fixed a driven member 7 of any suitable kind, such as a pulley or sprocket wheel or the like, that may be suitably driven, as from the tractor or a power unit on the tractor, or otherwise, as desired.

On the shaft 6 to turn or rotate therewith are a plurality of plow assemblies arranged in gang or rank, and each assembly has a supporting frame or rotor 8, which may be of spider or similar form, having counterpart members 9 extending radially or similarly, of which each has a hub part 10 fixed to a collar or the like 11, in turn suitably fixed to the shaft 6. To the outer ends of the members 9 are extensions 12 which are laterally spaced as shown in Fig. 2. To the outer sides of the extensions 12 are secured side frames 13 which may be of any desired form, as polygonal, and each having segments 14 to extend transversely of the extensions 12 and to be secured thereto by any suitable means, such as pins, rivets, bolts, screws, or the like 15. Extending outwardly from the frames 13 or arms 16 to which are secured closure members 17, as plates, to act as closure members for the rear or trailing ends of the plow shares or scoop-like members 18 later described, each closure member 17 being suitably fixed at its outer end to the outer end of the extension or arm 16 and at its inner end to a rearwardly extending portion of an adjacently connected frame segment 14.

To the outer ends of the extensions 12 are connected or secured sleeves 19 which extend across the space between each pair of opposed extensions 12, as shown in Fig. 2, and in these sleeves 19 are pivot pins or shafts 20, fixed, in any suitable way, to the sides 21 of the plow shares 18 so that the latter may have a turning movement relative to the sleeves 19 and extensions 12.

Each plow share 18 has a curved bottom 22, the leading end 23 of which is beveled or sharp like a knife edge to readily cut into the straw, humus or like material on or in the surface portion of the ground to be tilled or plowed. The bottom 22, is so curved that its trailing end portion will be nearer the axis of the shaft 6 so that as the plow share is rotated about the axis of the shaft 6 and also travels, as shown by the arrow 28, to cut into the top material 24, such trailing portion of the bottom 22 will clear the cut or plowed part of the material 24 and will not drag or jam on it.

Each bottom 22, at its side edges, is fixed to or integral with the lower edge parts of side walls 21 of the plow share, so that the cross-sectional form of the plow share 18, is U-shaped or channel shaped, the rear or trailing end of the share being open or having an opening 25 for the passage of plowed material, as later more fully explained. This opening 25 in a certain phase of operation or actuation of the device, as when plowing the material 24, will be closed by the closure plate 17. The forward ends of the side walls 21 preferably have cut-back or slanted portions 26 which may or may not be beveled to aid in cutting into the material 24 on the soil.

On intervening parts of the extensions 12 are provided stops 27, which may be in the form of pins, screws, studs, or the like, for the abutting thereagainst of the edges of the sides 21 of the shares 18, when the shares 18 are swung or actuated about the shaft 20, as later explained. The device generally is caused to travel relative to the ground in the direction of the arrow 28, as shown in Fig. 1, the tractor drafting the device being hitched ahead or forwardly of the device to pull or draw it in the direction of said arrow 28.

The plow assemblies carrying the shares 18 rotate about the axis of the shaft 6 in a direction that when the share 18 cuts into the material 24, its travel is then in the opposite direction of the travel of the device as a whole in the direction of the arrow 28. The plow share 18 will then be in closed condition, that is, with its rear or trailing open end 25 in closing contact with the closure plate 17 and will be held so closed as the share 18 is cutting through the material 24 (see Fig. 1). Normally, the shaft 6 will rotate at such a speed that the plow shares will be swung into open position about the axes of the pivot shafts 20 and as shown in dotted lines in Fig. 1, except the plow share 18 that is cutting through the material 24 (see the bottom of Fig. 1). When the plow share 18 leaves the material 24 (see dotted line position at lower right-hand portion of Fig. 1) the centrifugal force will cause the share 18 to open, as by turning about the axis of the pivot shaft 20, to the limit of the stop pins 27 by the abutting of the edges of the side walls 21 thereagainst, whereby the material in the plow share will be dumped or kicked so that the material will be deposited with the humus or the like under and the soil and the like upon it, upon the ground, as shown at the lower right-hand portion of Fig. 1. When the rotation of the shaft 6 is slow the shares 18 may have the positions shown in full lines in Fig. 1.

While I have shown four plow shares 18 in each assembly it is to be understood that any other number may be used as desired or found convenient. It will be noted that the assemblies are so arranged in rank that a plow share of one assembly will be in offset or staggered relation to a corresponding plow share of the adjacent assembly so that the plowing action in the material 24 will be in succession across the rank of the assemblies, which is clear from Fig. 3.

While I have herein described and upon the drawings shown an illustrative embodiment of the invention, it is to be understood that the invention is not limited thereto but comprehends other constructions, details, arrangements of parts, and the like, without departing from the spirit of the invention.

Having thus disclosed the invention, I claim:

1. In a rotary plow device of the character disclosed having a rotatable member for carrying a plow assembly to rotate therewith: a plow assembly frame having arms extending outwardly from the rotatable member and carried to rotate therewith, and cross pieces connected to said arms and having connections to each other for completing the frame structure, each of said arms having at the outer end thereof means for pivotally supporting a plow share, a plow share having means for pivotal connection to said outer end of said arm, a closure member for each plow share and carried by end portions of said cross pieces as are connected to each other and located to close the plow share when the plow share is operating in material to be plowed and to open the same when the plow share is moved upward over the just previously plowed and dumped material, and means on said arm inwardly of the plow share to limit the opening of said plow share.

2. In a device as set forth in claim 1, and in which the plow share has spaced side walls, and in which said means for pivotally supporting the plow share is in the side walls of the plow share.

3. In a device as set forth in claim 1, and wherein said stop means is located to engage the side walls of said plow share.

CHARLES A. CLELAND.

REFERENCES CITED

The following references are of record in the file of this patent:

UNITED STATES PATENTS

| Number | Name | Date |
|---|---|---|
| 1,273,458 | Christensen | July 23, 1918 |
| 1,889,016 | Dinsmore | Nov. 29, 1932 |
| 2,241,675 | Rinehart | May 13, 1941 |

FOREIGN PATENTS

| Number | Country | Date |
|---|---|---|
| 506,519 | France | Aug. 24, 1920 |